United States Patent
Krishnan et al.

(10) Patent No.: US 6,405,316 B1
(45) Date of Patent: Jun. 11, 2002

(54) METHOD AND SYSTEM FOR INJECTING NEW CODE INTO EXISTING APPLICATION CODE

(75) Inventors: Ganapathy Krishnan, Bellevue; Scott Oyler, Seattle, both of WA (US)

(73) Assignee: Network Commerce, Inc., Seattle, WA (US)

( * ) Notice: Subject to any disclaimer, the term of this patent is extended or adjusted under 35 U.S.C. 154(b) by 78 days.

(21) Appl. No.: 09/627,265

(22) Filed: Jul. 28, 2000

Related U.S. Application Data

(62) Division of application No. 08/792,719, filed on Jan. 29, 1997, now Pat. No. 6,141,698.

(51) Int. Cl.[7] .................................................. H04L 9/00
(52) U.S. Cl. ...................................... 713/190; 713/194
(58) Field of Search ................................. 709/310–320, 709/328, 329; 705/50–80; 713/150–202

(56) References Cited

U.S. PATENT DOCUMENTS

| | | | | |
|---|---|---|---|---|
| 4,634,807 A | * | 1/1987 | Chorley et al. ............... 705/55 |
| 4,847,902 A | * | 7/1989 | Hampson .................... 713/190 |
| 5,222,134 A | * | 6/1993 | Waite et al. .................. 705/59 |
| 5,388,211 A | * | 2/1995 | Hornbuckle ................ 717/178 |
| 5,530,752 A | * | 6/1996 | Rubin .......................... 705/59 |
| 5,598,470 A | * | 1/1997 | Cooper et al. ............... 713/165 |
| 5,684,875 A | * | 11/1997 | Ellenberger .................... 482/4 |
| 5,757,919 A | * | 5/1998 | Herbert et al. ............... 713/187 |
| 5,825,878 A | * | 10/1998 | Takahashi et al. ........... 713/190 |
| 5,845,281 A | * | 12/1998 | Benson et al. .................. 707/9 |
| 5,862,217 A | * | 1/1999 | Steinberg et al. ............ 713/176 |
| 5,892,900 A | * | 4/1999 | Ginter et al. ................ 713/200 |
| 6,006,328 A | * | 12/1999 | Drake ......................... 713/200 |
| 6,052,780 A | * | 4/2000 | Glover ........................ 713/193 |
| 6,292,569 B1 | * | 9/2001 | Shear et al. ................. 380/255 |

* cited by examiner

*Primary Examiner*—St. John Courtenay, III
(74) *Attorney, Agent, or Firm*—Perkins Coie LLP

(57) ABSTRACT

A method and system for modifying the behavior of existing executable code by injecting new code into an executable file is provided. The injection mechanism injects a reference to new code contained in a DLL into an existing executable file such that, when the code of the executable file is executed, the DLL is automatically loaded and the new code is automatically executed. A reference to the DLL is injected into the executable file by either modifying an import table of the file, which causes automatic loading of the DLLs referred to therein, or by adding DLL loader code to the file. The DLL loader code uses an underlying operating system call to load the DLL. Further, the injection mechanism provides enhanced security by injecting security code and data into the executable file. The injected security code mechanism uses an incremental encryption and decryption process to encrypt and decrypt portions of the executable file in a more secure manner.

7 Claims, 14 Drawing Sheets

METHOD AND SYSTEM FOR INJECTING NEW CODE INTO EXISTING APPLICATION CODE

CROSS REFERENCE TO RELATED APPLICATION

This application is a divisional of U.S. patent application Ser. No. 08/792,719, now U.S. Pat. No. 6,141,698 filed Jan. 29, 1997 and allowed Jun. 20, 2000.

TECHNICAL FIELD

The present invention relates to modifying existing application code and, in particular, to injecting a dynamic link library into an existing executable file.

BACKGROUND OF THE INVENTION

In current computer systems, there often exists a need for modifying the behavior of executable code stored in a pre-existing executable file. For the purposes of this application, an "executable file" is any type of code image and is not limited to a particular type of executable file or a file with a particular file name extension. In particular, the need exists to change the is behavior of an application without recompiling the application. This need is especially apparent in situations where it is impossible or too much work to recompile the application. For example, an application may be developed by a source company at one site and distributed to a third party vendor at another site. The third party vendor may wish to incorporate vendor-specific code into the application before redistributing it to an end customer. However, the third party vendor may not have access to the source code that the source company used to generate the executable file. Thus, the third party vendor cannot change and recompile the source code to generate a new executable file with the vendor-specific code.

As another example, especially relevant in today's extensive networking environments, a company may desire to put an existing application on the Internet and somehow incorporate licensing code to limit any use of illegal copies of the application. Current systems have tried various solutions to incorporate licensing code into an existing application. According to one technique, which will be referred to herein as "wrapping," a second application program (a wrapper program) is distributed on the network, which includes an encrypted version of the original application program. The wrapper program, when installed, decrypts the encrypted original application program and then proceeds to execute the original application program. To successfully decrypt the program, a legitimate end user must provide the proper licensing information to enable the decryption to operate. A security hole exists, however, in that, while the wrapping program is in the process of decrypting the original application executable file, temporary files are created to hold the decrypted program code. Once the entire original application program has been decrypted and stored in the temporary file, a "software pirate" can then make multiple copies of the original unencrypted application program in the temporary file and can distribute them illegally.

Further, use of the wrapping technique to incorporate licensing provides only limited additional security to a vendor who implements what is known as a "try and buy" licensing program. A try and buy licensing program typically distributes an application program with either limited functionality or for a limited time of use to enable a potential customer to explore the application. Functionality is typically limited, for example, by turning off a set of features. Once the potential customer is satisfied, the customer can pay for and license the application program properly. If an application program is distributed using the wrapping technique to potential customers for the purpose of a try and buy program, then, when the program is decrypted and stored in a temporary file, a software pirate can determine how to turn on the disabled features or how to remove the license expiration data. These security problems can result in the distribution of illegal copies, which are hard to detect and monitor in a global network environment.

A second technique for modifying the behavior of an existing application program directly inserts the new executable code into the executable file. Using the direct insertion method, an application developer determines where in the executable file the new code should be placed and inserts the code into the executable. After inserting the new code into the existing executable file, the application developer adjusts addresses that reference any relocatable code or data that follows the inserted code to account for the newly added code. However, it is very difficult for an application developer to determine where to insert code and to then test the entire application to ensure it works correctly. An application developer would typically need to disassemble the executable file and study the disassembled code to determine where to insert the code. Such disassembling and studying is a very time-consuming process. Furthermore, the process must be repeated for each application program, and for each version of each application program in which the code is to be inserted.

Thus, the need exists to modify the behavior of executable code stored in an existing executable file in a manner that is secure and that requires minimal testing outside the scope of standalone testing of the code that provides the modified behavior.

SUMMARY OF THE INVENTION

The present invention provides a method and system for injecting new code into already existing executable code within an executable file. The injection mechanism provided by the present invention can be used to inject a dynamic link library (DLL) that contains the new code or to inject arbitrary code into an existing executable file. The injection of new code enables the existing executable code to perform new behaviors. For example, licensing procedures can be added to an existing application by injecting a licensing DLL into the application using the injection mechanism.

In one embodiment, the injection mechanism injects into the existing executable file new DLL code and optionally injects additional security code, which is provided by the injection mechanism. Preferably, the injected security code performs checksum comparisons on some portions of the executable file, decrypts and executes a previously encrypted portion of the executable code, and decrypts and transfers execution control to a previously encrypted location in the original executable code. The injection of security code helps to prevent modification of the executable file to omit the injected code and thereby restore the executable file to its original, unmodified state. In the case of newly added licensing code, the injected security code aids in preventing illegal altering, copying, and distribution of the original executable code.

The injection mechanism provides two methods for injecting a DLL into existing executable code. The first method modifies an import table of the executable file to include a reference to the new DLL code. A second method modifies the executable file to include DLL loader code, which is provided by the injection mechanism. The DLL loader code uses system provided calls to load the desired new DLL. The injection of security code can be utilized with both methods of injecting a DLL.

The present invention also provides incremental encryption and decryption techniques, which can be used to further secure any of the injected code. The incremental encryption and decryption techniques operate by encrypting (and subsequently decrypting) blocks of code of varying sizes, using a different key for each block. The decryption code decrypts each block and executes the decrypted code, one block at a time, and overwrites each decrypted block when decrypting a next block. This process ensures that the entire unencrypted code is never visible at any one time.

DETAILED DESCRIPTION OF THE INVENTION

Figure 1:
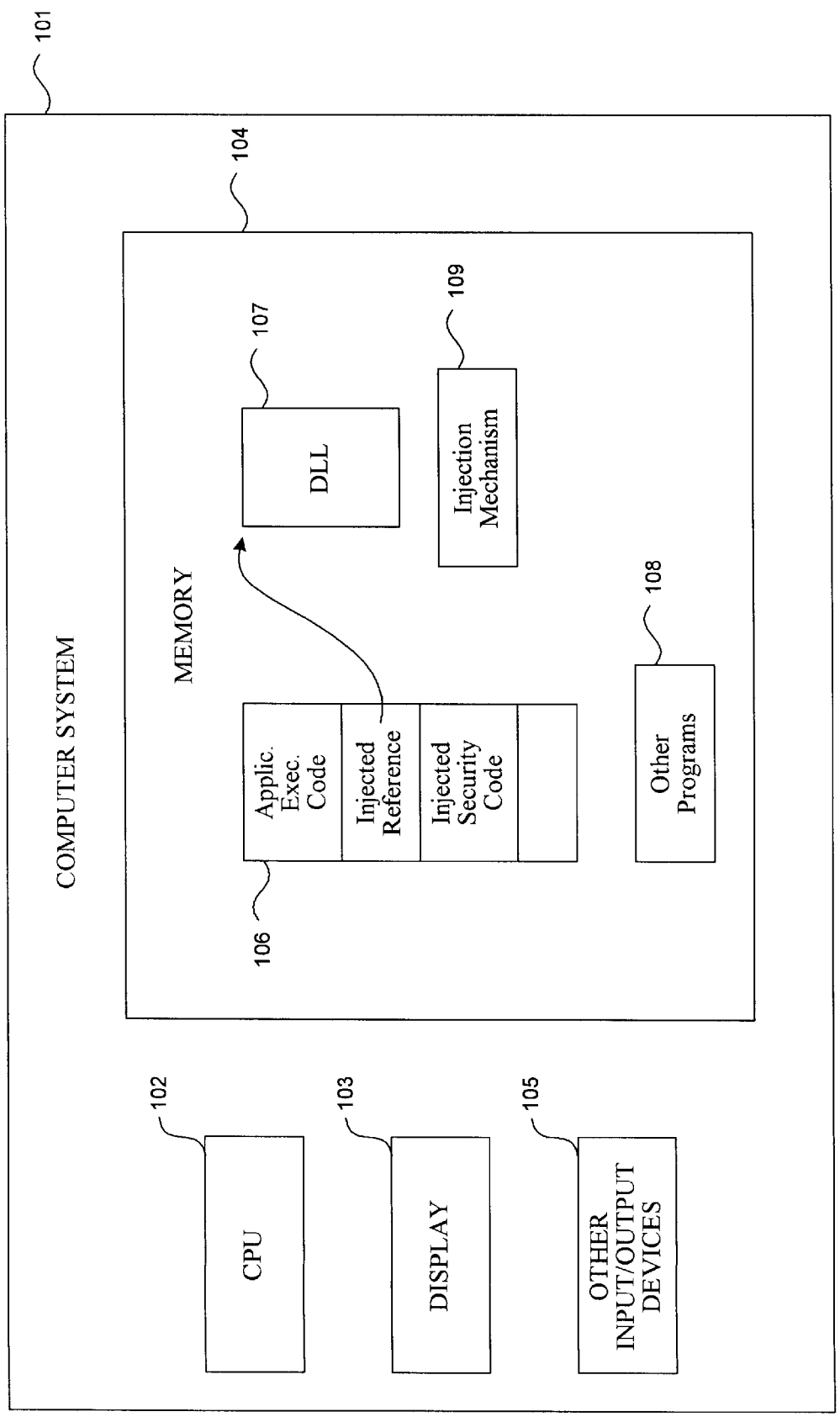
FIG. 1 is a block diagram of a general purpose computer system for practicing embodiments of the injection mechanism.

The present invention provides a method and system for modifying the behavior of existing executable code by injecting new code into an executable file. The injection mechanism of the present invention provides techniques for injecting a reference to a new dynamic link library ("DLL") which contains new code into an existing executable file such that when the code of the executable file is executed, the DLL is automatically loaded and the new code is automatically executed. The injection mechanism provides the automatic loading of the DLL by either modifying a table used by the underlying system to automatically load DLLs or by inserting code that knows how to load the DLL. Thus, a developer desiring to add new behavior to the existing executable code stored in the executable file can do so by providing the new behavior as DLL code. The desired new behavior is preferably provided in an initialization routine of the DLL (e.g., "DLLMain" in the WINDOWS/NT operating system). The injection mechanism ensures that the DLL initialization routine is automatically executed when the DLL is mapped into the executable code image process space and loaded into memory. Thus, using the injection mechanism, any new code can be added to an existing executable file as long as the new code resides in a DLL. Also, because the DLL is separately testable and modifiable, the injection mechanism of the present invention reduces the time needed to develop and test the new code.

According to the injection mechanism, the reference to the new DLL is injected into the existing executable code in one of two ways. According to the first method, a DLL is injected into existing code by modifying the import table of the existing executable file. An import table is a data structure supported by the underlying operating system that indicates the names of DLLs to be mapped into the executable code when it is run (and loaded if not already loaded into memory when the executable file is loaded). The import table also includes references to the functions within each listed DLL that are called by code in the executable file. (The executable code invokes the functions of a DLL as external references.) The second method for injecting a reference into the executable code modifies the executable code to include DLL loader code, which is provided by the injection mechanism. The DLL loader code relies on the underlying system to provide a mechanism for loading DLLs at run time. This method is useful when no load-time DLL loading mechanism, such as the import table mechanism, is provided by the operating system.

The injection mechanism also provides a technique for injecting security code into the existing executable file to ensure that neither the injected reference to the DLL nor the DLL has been modified. The security code injection technique performs and stores checksums on portions of the executable file and DLL, encrypts a portion of the executable code in the executable file, and inserts security code into the executable file. The security code that is inserted computes checksums on the various portions of the executable file and the DLL and verifies that the checksums are the same as those originally stored. The security code also decrypts and executes the previously encrypted portion of the executable code using an incremental decryption process. The incremental decryption process ensures that a complete version of the unmodified executable file is never visible at any one time. Thus, the injection of security code makes it impossible for somebody to recreate an unmodified version of the existing executable file in a reasonable amount of time.

The injection mechanism is useful in many scenarios. For example, in a globally networked system such as the Internet, licensing code can be incorporated into an existing application and distributed on the system by injecting the licensing code into the application using the injection mechanism. The licensing developer creates a new DLL with the new licensing code accessible through the initialization function of the DLL. The developer then uses the injection mechanism of the present invention to create a modified version of the application that includes a reference to the new DLL. This modified version is then distributed. Further, the newly injected licensing code can be made more secure by using the injection mechanism to inject security code into the modified application. The injected security code makes it impossible to recreate in a reasonable amount of time an unmodified version of the application that does not include the injected licensing DLL.

The injection mechanism is also useful in other scenarios that require the addition of code to an existing executable file in order to provide modified behavior to existing executable code. As an example, the injection mechanism can be used to modify a network browser, such as an Internet browser, to start and stop applications upon command. In this case, code that starts and stops a designated application is created as a new DLL. The DLL that contains the "start and stop" code is then injected into the browser using the injection mechanism. The application to be started and stopped upon invocation of a command may be designated, for example, by prompting a user for input. Also, the starting and stopping behavior upon command invocation could be provided in the start and stop code using well-known techniques such as a graphical button, menu, or keyboard command.

The injection mechanism also can be used to incorporate additional user interface behavior into an existing application. For example, the injection mechanism could be used to insert a third-party vendor-specific set of menus into an existing application. It is assumed, in this case, that the underlying operating system supports calls to add a menu with menu items into an existing application menu, as well as the ability to handle events caused by the selection of items from the new menu. For example, the MICROSOFT WINDOWS 3.1 operating system provides the "Append Menu," "Insert Menu," and "Set Menu" functions to create and add menus to an application. To add a set of menus, the third-party developer creates new code which creates the menus using the underlying system calls, places the menu appropriately on the screen, and handles any events triggered by the menu items. The newly created menu code is then injected into the application using the injection mechanism.

In a preferred embodiment, the methods and systems of the injection mechanism are implemented on a computer system comprising a central processing unit, a display, a memory, and other input/output devices. Preferred embodiments are designed to operate in an environment that supports shared independent code modules, such as the dynamic link libraries provided by various versions of the WINDOWS operating system. Dynamic link libraries and their use are discussed further in the Charles Petzold, *Programming Windows*, 2d ed., Microsoft Press, Redmond, 1990, pp. 877–915, which is herein incorporated by reference. One skilled in the art will recognize that embodiments of the injection mechanism can be practiced in other environments that support other types of shared, linkable library modules.

FIG. 1 is a block diagram of a general purpose computer system for practicing embodiments of the injection mechanism. The computer system 101 contains a central processing unit (CPU) 102, a display 103, a computer memory (memory) 104, and other input/output devices 105. The injection mechanism 109 preferably resides in the memory 104 and executes on the CPU 102. The executable code of an application 106 is shown residing in memory 104 after the injection mechanism 109 has injected a reference to a new DLL 107 and after the injection mechanism 109 has injected security code into the executable file. Other programs 108 also reside in the memory 104. One skilled in the art will recognize that the preferred injection mechanism can be implemented in a distributed environment where more than one computer system is used to communicate with other computer systems. For example, the application executable code 106 may reside on a different computer system from the DLL 107 or from the injection mechanism 109. In either case, the injection mechanism 109 preferably relies on the operating system to support the loading of DLLs across different computer systems.

Figure 2:
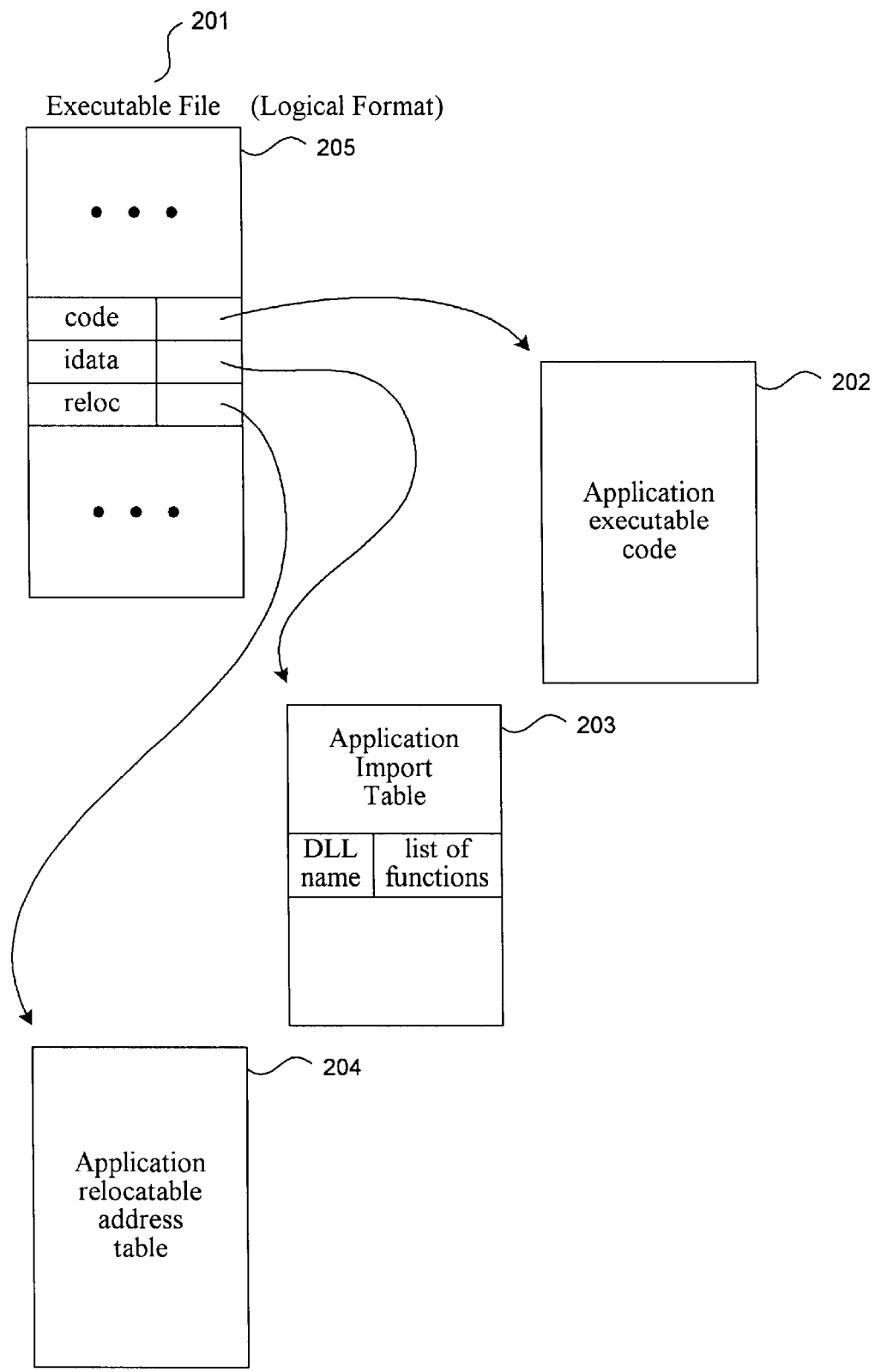
FIG. 2 is a block diagram of a logical format of an executable file that can be used with the present invention.

Because the injection mechanism injects a reference to a new DLL and optionally injects security code by adding code into an existing executable file, the injection mechanism needs to have knowledge of the different executable file formats it wishes to manipulate. Although the mechanism itself operates independently of the executable file format, the injection mechanism needs to be aware of the file format in order to determine the proper locations at which references or code should be added. FIG. 2 is a block diagram of a logical format of an executable file that can be used with the present invention. Executable file 201 comprises a header section 205, an application executable code section 202, an application import table section 203, and an application relocatable address table section 204. The term application is included here for ease of description, although it will be recognized that the executable file may be for some code segment other than an application, for example, a module that comprises part of a program, or a DLL. The header section 205 includes pointers to the application executable code section 202, the import data section 203, and the relocatable data section 204.

The executable file format illustrated in FIG. 2 is a logical representation of the PE file format supported by the MICROSOFT/NT operating system and other operating systems. The particulars of the PE file format are discussed further in *Microsoft Portable Executable and Common Object File Format, Specification* 4.1, Microsoft Corporation, August 1994, which is herein incorporated by reference. One skilled in the art will recognize that this file format is merely illustrative and that other file formats will work. The executable file may be comprised of multiple memory segments, which are not necessarily contiguous. Other figures of the executable file referred to herein are oriented as if they were one logical contiguous sequence of memory addresses. However, it will be appreciated that the layout of these other figures as contiguous is for ease of description purposes. Also, note that although executable file refers to "file" in singular, one skilled in the art would appreciate that the injection mechanism of the present invention would be operable in an environment where multiple files comprise the executable file that is stored in secondary storage.

As discussed above, the injection mechanism injects a reference to a new DLL according to two different methods. The first method modifies the import table of the executable file, whereas the second method modifies the executable file to include DLL loader code that is provided by the injection mechanism. The first method for injecting a reference to a DLL is discussed in detail with reference to FIGS. 3 and 5. The second method for injecting a reference to a DLL is discussed in detail with reference to FIGS. 6 and 7.

Figure 3:
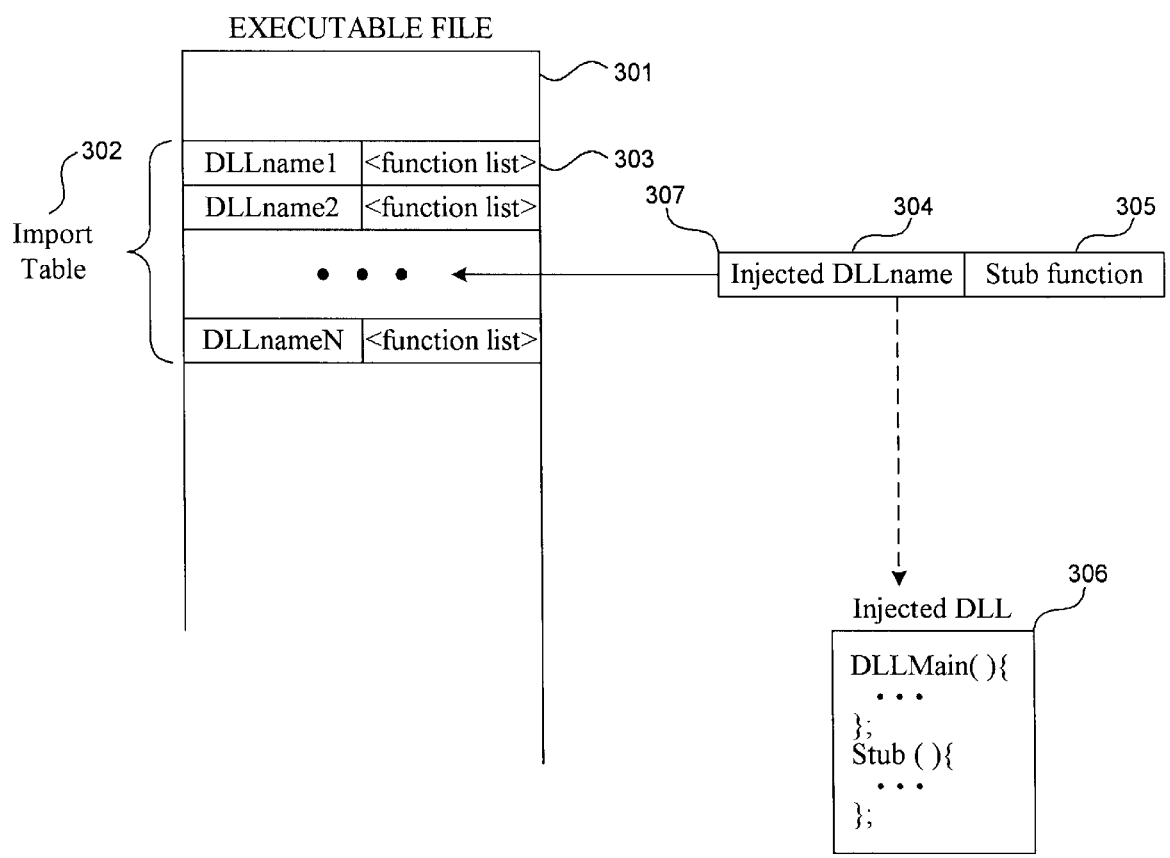
FIG. 3 is an overview block diagram of the procedure for injecting a reference to a new DLL into an import table of an existing executable file.

FIG. 3 is an overview block diagram of the procedure for injecting a reference to a new DLL into an import table of an existing executable file. In FIG. 3, executable file 301 contains import table 302. As previously mentioned, the import table 302 enables the underlying operating system to determine which DLLs to map into the process space and to load into memory when the executable file is loaded into memory for execution. Import table 302 contains one import entry per DLL. Each import entry, for example entry 303, contains the name of the DLL to be loaded and a list of the external functions defined in the DLL which are referenced by executable file 301.

To inject new DLL 306, the injection mechanism finds an appropriate place to add a new entry into import table 302 and adds a new entry, which includes a reference to the injected DLL 306. Specifically, a new import entry 307 is inserted into the import table and includes the name of the DLL 304 to be injected and a "dummy" function, herein named the stub function 305. The stub function 305 is not actually referenced by the executable code contained in executable file 301, but the format of the import table may require the name of at least one function to be included in the entry. As can be seen injected in FIG. 3, DLL 306 preferably contains a DLLMain function (the initialization function), which is automatically invoked by the underlying operating system as a result of including the new import entry 307 into import table 302.

Figure 4:
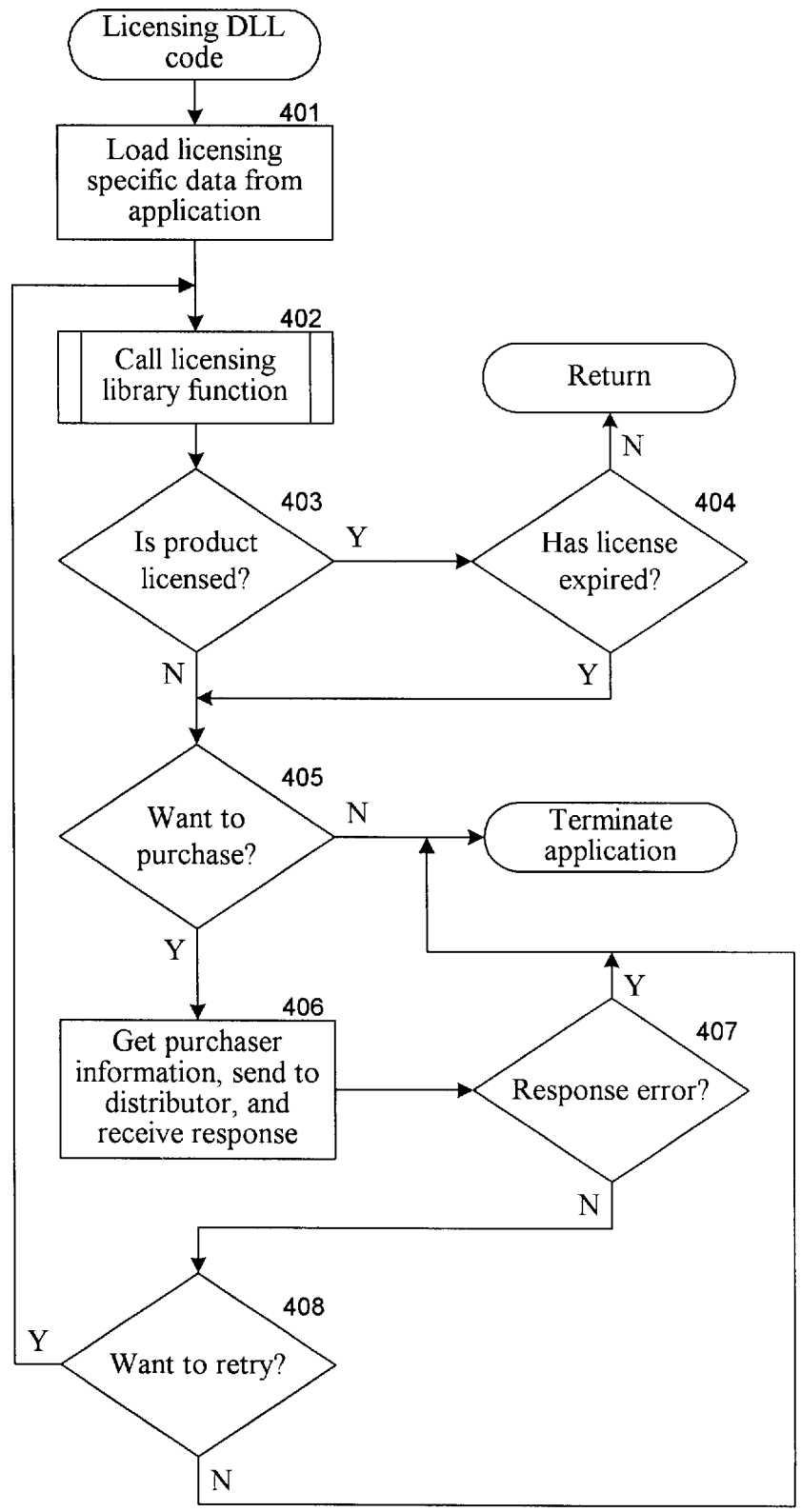
FIG. 4 is a flow diagram of example code that can be placed into an injectable DLL in order to incorporate licensing into an existing application.

FIG. 4 is a flow diagram of example code that can be placed into an injectable DLL in order to incorporate licensing into an existing application. This licensing code provides an example of code that is added to the DLLMain routine of the injected DLL 306 of FIG. 3 to provide licensing over a network such as the Internet. In step 401, the licensing code loads any licensing specific data, such as what features of the application are subject to a license, from the application executable file. In step 402, the code calls some function within a licensing library to determine whether the product is licensed. For example, the licensing library may provide the ability to encrypt a key as a license, and the function referred to in step 402 would then decrypt a stored value and make an assessment as to whether the key is still valid. In step 403, if it is determined that the product is licensed, then the code continues in step 404, else continues in step 405. In step 404, the code determines whether the license has expired and, if so, continues in step 405, else returns. In step 405, the code determines whether the user wishes to properly purchase the product, and if not, terminates the application, else continues in step 406. In step 406, the code obtains purchasing information, sends it to the distributor, and then waits to receive a response from the distributor. In step 407, the code determines whether an error response was received from the distributor and, if so, terminates the application, else continues in step 408. In step 408, the code determines whether the user wishes to retry the licensing procedure with the received licensing data from the distributor and, if so, continues back to step 402 to process the data, else terminates the application.

Figure 5:
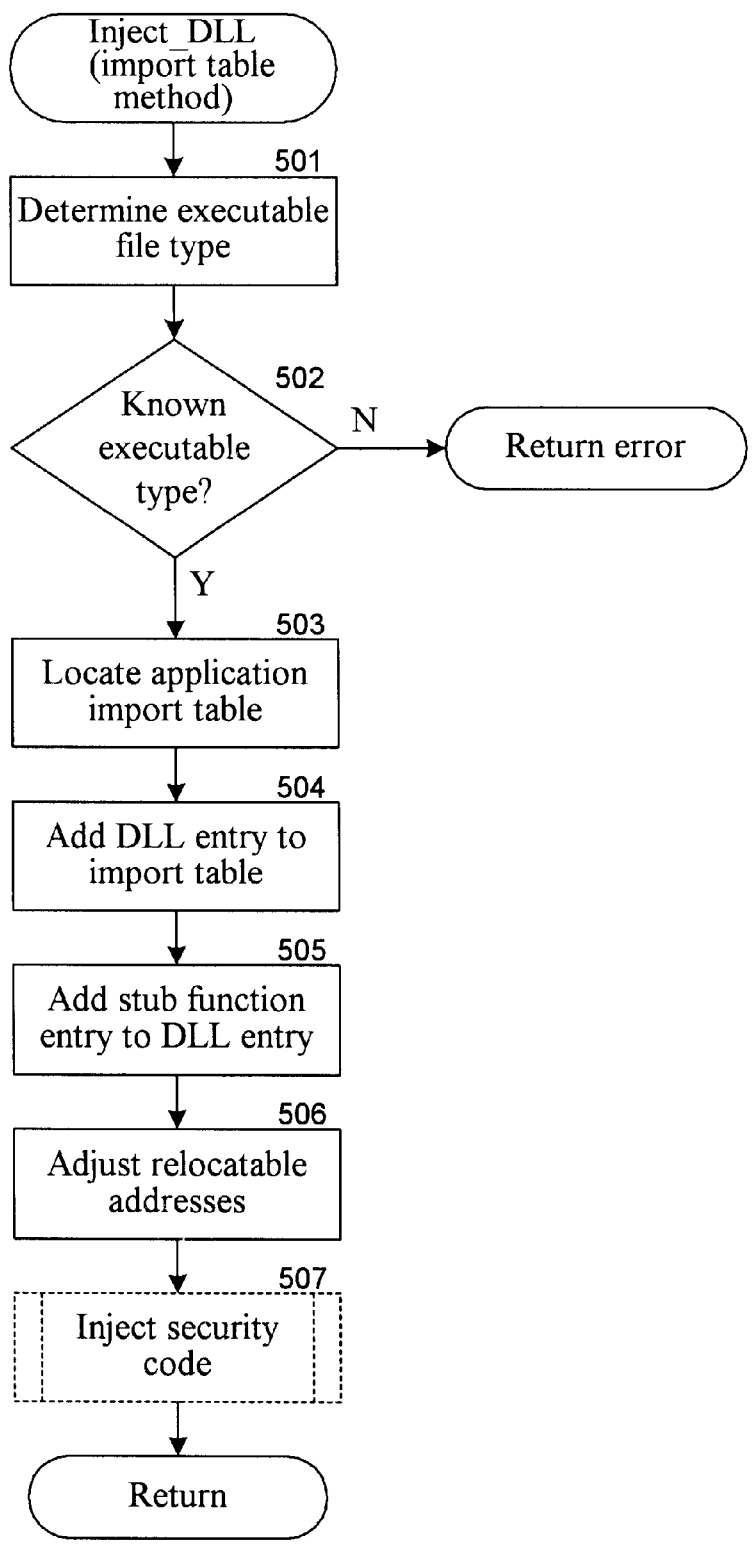
FIG. 5 is a detailed flow diagram of the steps used by the injection mechanism to inject a new DLL using the import table technique.

FIG. 5 is a detailed flow diagram of the steps used by the injection mechanism to inject a new DLL using the import table technique. These steps are implemented by the injection mechanism code 109 shown in FIG. 1. In step 501, the injection mechanism determines the type of the executable file. Then, in step 502, if it is a known executable file type, the injection mechanism continues in step 503, else returns an error. In step 503, the routine locates where in the executable file the import table for the application is located. For example, according to the executable file format shown in FIG. 2, the import data ("IData") entry of the header section 205 can be used to locate application import table 203. Once located, in step 504, the routine creates a new import entry that refers to the new DLL and adds the new entry to the import table. In step 505, a reference to the stub function of the new DLL is added to the import entry. Then, in step 506, the routine adjusts any of the references to relocatable addresses in the executable file that numerically follow the added entry to the import table. This adjustment of relocatable addresses is needed because, by adding a new import table entry, the size of the import table has changed. Thus, everything that was logically below the import table is moved further down. The adjustment of relocatable addresses is similar to the steps performed by a linker/loader mechanism. One such system for adjusting addresses using the PE file format is described in Matt Pietrek, "Peering Inside the PE: A Tour of the Win32 Portable Executable File Format," *Microsoft Systems Journal*, March, 1994, which is herein incorporated by reference. The injection mechanism of the present invention preferably does not publicize where within the application import table the new entry, which refers to the new DLL, is added. It is not important where the entry is added so long as the step of adjusting relocatable addresses of step 506 is performed appropriately. By not publicizing the location, the amount of time needed to break the security is increased. In step 507, the routine follows the procedure for injecting security code into the executable file, and then returns. Step 507 is optional, as discussed earlier, and is used to increase the probability that the modified executable file will not be able to be unmodified and subsequently executed without the modifications. The injection of security code is discussed in detail with reference to FIG. 9.

Figure 6:
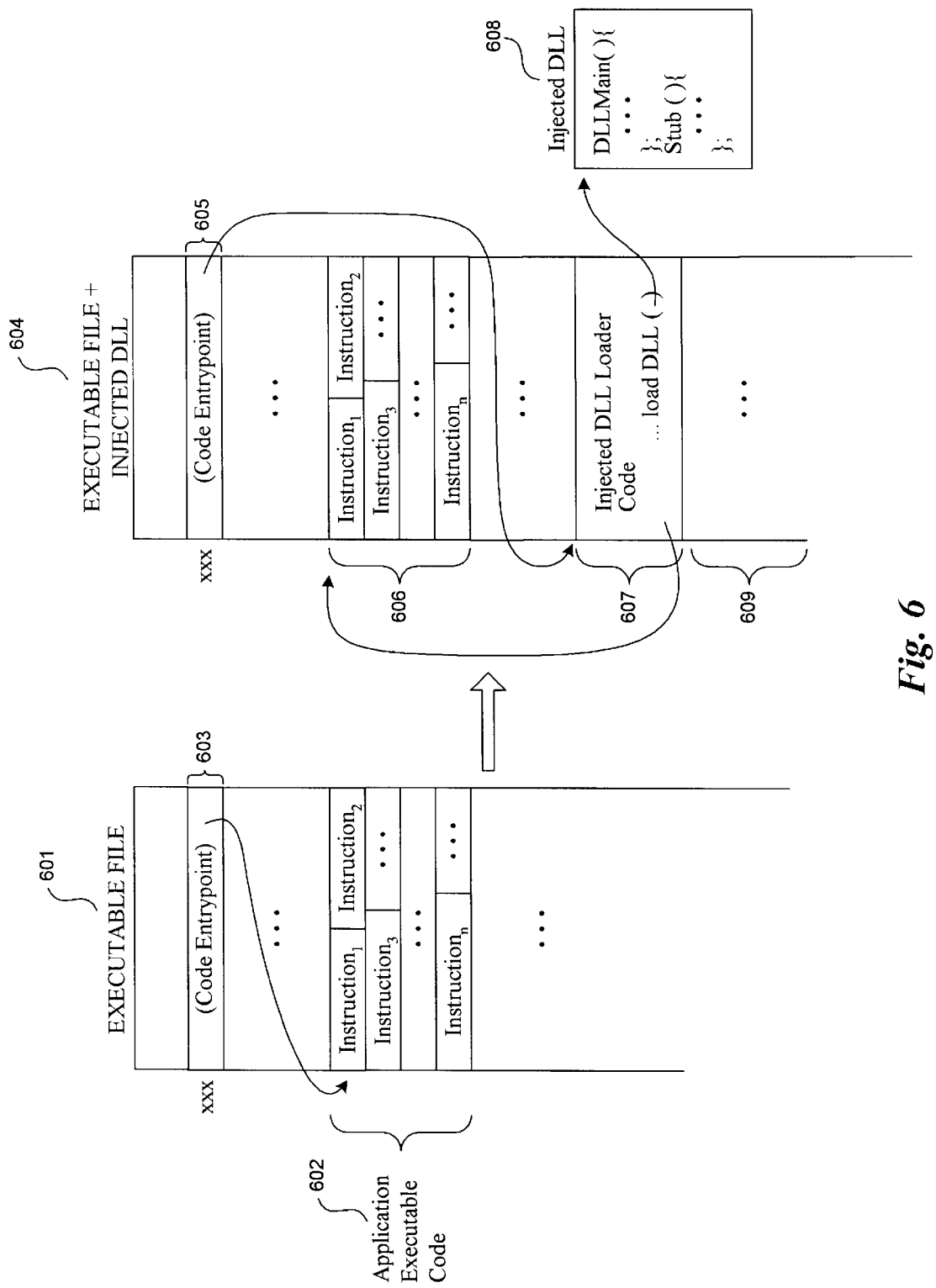
FIG. 6 is an overview block diagram of the modifications made to an executable file by the injection mechanism to inject a reference to a new DLL using the DLL loader code technique.

FIG. 6 is an overview block diagram of the modifications made to an executable file by the injection mechanism to inject a reference to a new DLL using the DLL loader code technique. Executable file 601 represents the logical state of the executable file before any modifications have been made. Executable file 601 contains an indicator 603 of the entry point of the executable code, which is shown located for the purposes of example at address "xxx." Note that the FIG. 6 shows a logical layout of an executable file, in which all the addresses appear to be sequential and continuous. This logical layout is used for the purposes of illustration only as discussed earlier with reference to FIG. 2. The entry point indicator 603 typically points to the first instruction in the application executable code segment 602. The instructions comprising executable code segment 602 may vary in size depending upon the instruction set of the underlying computer system.

In FIG. 6, executable file 604 represents the logical state of the executable file after the injection mechanism has inserted DLL loader code into the executable file 604. Specifically, the injection mechanism determines a location within the code in which to copy the DLL loader code, copies the DLL loader code, modifies the code entry point indicator 605 (located at address "xxx") to point to the newly added DLL loader code, and stores the value of the previous entry point indicator so that it can be accessed when the DLL loader code is executed. In this manner, when the executable file is executed, it will begin executing at the DLL loader code instead of the code entry point referred to by indicator 605. The DLL loader code will load the new DLL before executing the original application executable code 606. The injected DLL loader code 607 contains an instruction at the end of the DLL loader code to transfer control back to the original application executable code 606. The injected DLL loader code 607 preferably contains a call provided by the underlying operating system to load the new DLL. This call contains a reference to the new DLL 608, which becomes the injected DLL. As discussed with reference to the import table technique shown in FIG. 3, the injected DLL 608 contains a DLLMain routine, which is automatically called by the operating system LoadDLL system call and therefore should contain the modifying behavior that the application programmer wishes to add to the executable file. For example, the application programmer could add the licensing procedures discussed earlier or the user interface additions to the DLLMain routine. Injected DLL 608 is presumed to be the same as the DLL injected into the executable file 306 using the import table technique shown in FIG. 3. Alternatively, the injected DLL loading code could directly invoke a predefined function of the injected DLL.

Figure 7:
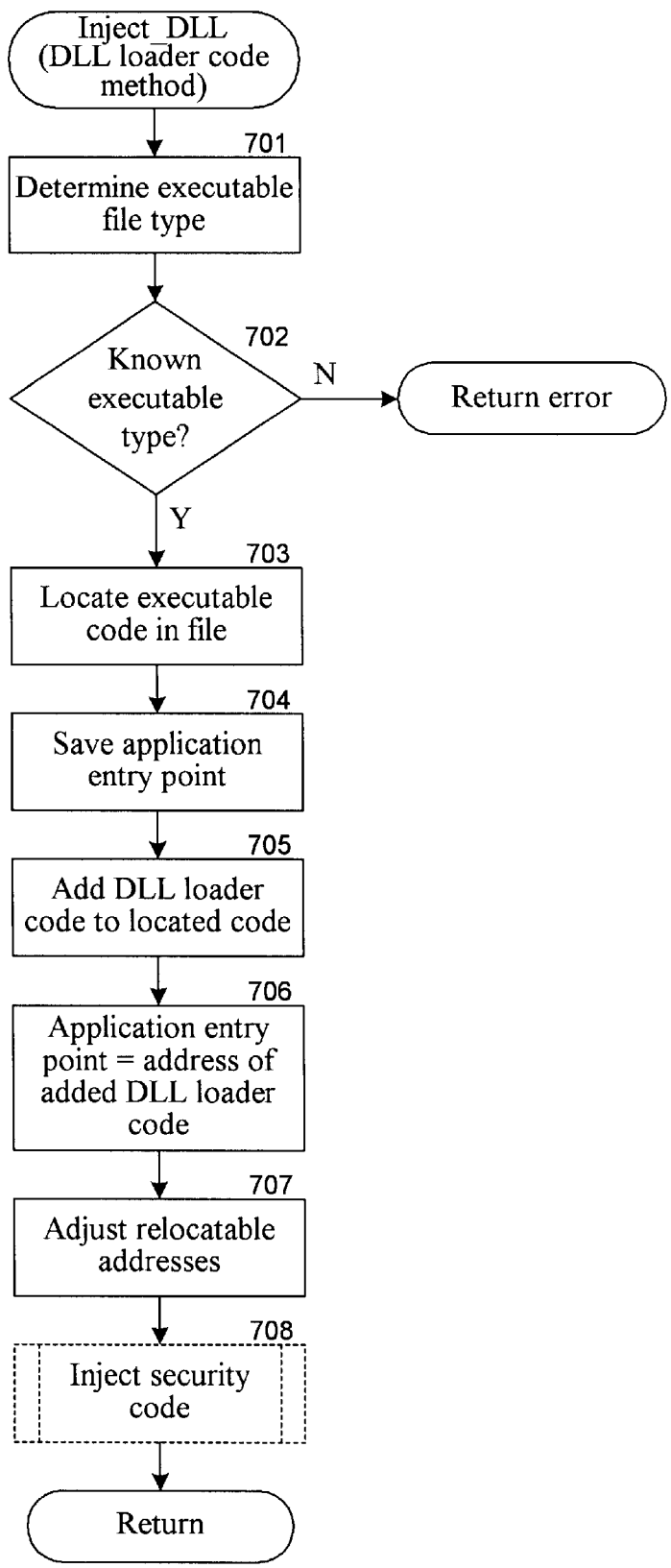
FIG. 7 is a flow diagram of the steps used by the injection mechanism to inject a new DLL using the DLL loader code technique.

FIG. 7 is a flow diagram of the steps used by the injection mechanism to inject a new DLL using the DLL loader code technique. In particular, in step 701, the injection code determines the type of the executable file. In step 702, if the executable file type is known to the injection code, the routine continues in step 703, else returns an error because the injection mechanism does not know how to inject code into an unknown executable file type. In step 703, the routine determines the location of the executable code in the executable file. In step 704, the routine saves the original application code entry point (e.g., the contents of code entry point indicator 603 in FIG. 6). In step 705, the routine adds the DLL loader code to a predetermined location within the located executable code. Similar to the import table technique discussed with reference to FIG. 5, it is specifically intended that the location where the DLL loader code is placed is not publicized for security reasons. The exact location is preferably immaterial to the operability of the invention. In step 706, the routine resets the code entry point of the application to the address of the newly added DLL loader code and in step 707 adjusts any relocatable addresses that need adjusting due to the increase in code size at the location where the DLL loader code was added. In step 708, the injection mechanism code optionally injects security code, and then returns. The injection of security code is discussed in detail with reference to FIG. 9.

Once the behavioral modifications desired have been added to the executable file by means of injecting a DLL according to either the import table method or the DLL loader method, the executable file when executed will perform any behaviors added to the DLL. However, the modifications made by injecting a DLL are not without security risks. Specifically, without further security measures, a skilled programmer could substitute for the injected DLL another DLL which did not perform the associated behaviors. Or, the programmer could take out the entry in the import table if the import table technique is used. Further, a skilled programmer could modify the injected DLL loader code to load a dummy DLL instead of the injected DLL. For these reasons, the injection mechanism of the present invention provides the added feature of injecting security code into the executable file. Although the techniques used to inject the security code are discussed herein in detail, the particular locations where certain pieces of encrypted code are stored and the particular keys used should preferably not be publicized. These locations and keys are not needed to use or understand the operations of the present invention and are preferably kept secure by the injection mechanism.

Figure 8B:
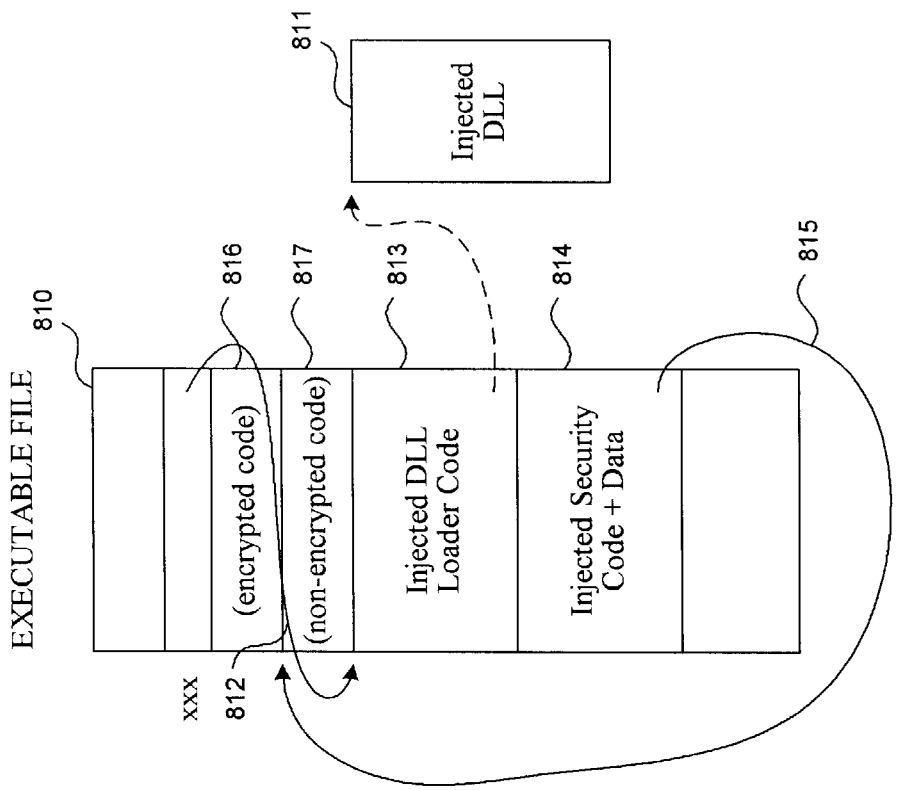
FIG. 8B is a block diagram of the logical layout of an executable file after security code has been injected into the executable file using the DLL loader code technique.
Figure 8A:
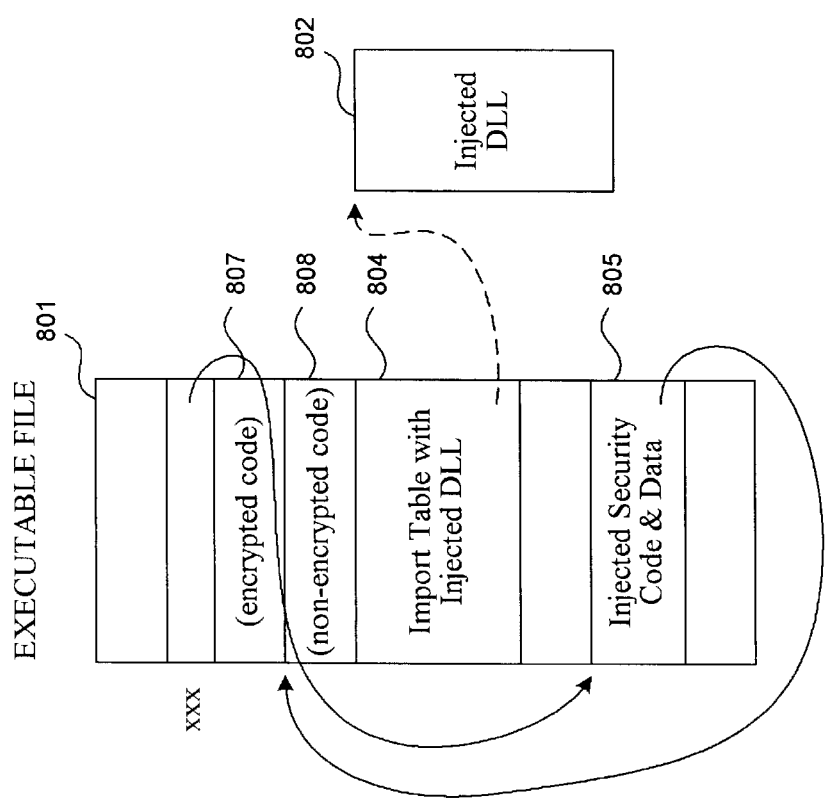
FIG. 8A is a block diagram of the logical layout of an executable file after security code has been injected into the executable file using the import table technique.

FIG. 8A is a block diagram of the logical layout of an executable file after security code has been injected into the executable file using the import table technique. Executable file 8A01 is shown with import table 8A04 modified to refer to injected DLL 8A02, as discussed with reference to FIG. 3. Executable file 8A01 contains a code entry point indicator located at address "xxx," encrypted application code 8A07, unencrypted application code 8A08, an import table 8A04, which refers to injected DLL 8A02, and injected security code and data 8A05. The injection mechanism inserts security code and data by adding the appropriate code and data 8A05 to the executable file 8A01 at a predetermined location. The injection mechanism then modifies the application code entry point indicator 8A03 to point to the newly added security code. In addition to injecting security code and data 8A05, the injection mechanism encrypts some portion of the original application executable code to further prevent tampering with the modified executable file. In addition, checksums are computed on certain portions of the executable file, to be discussed further below, which are then encrypted and stored as the injected security data shown as part of section 8A05 in FIG. 8A. Preferably, the injected security code is stored in a predetermined location and the injected encrypted data is stored at another predetermined location, which is preferably not publicized but is kept track of by the injection mechanism. The injection mechanism also inserts a transfer of control instruction back to the application executable code in the security code and data section 8A05. The location transferred to is preferably the original application executable code entry point combined with the size of the code encrypted starting with the entry point 8A06. That is, the transfer of control should occur to the first unencrypted location after the original code entry point.

FIG. 8B is a block diagram of the logical layout of an executable file after security code has been injected into the executable file using the DLL loader code technique. Executable file 8B10 contains a code entry point indicator located at address "xxx," encrypted application code 8B16, unencrypted application code 8B17, injected DLL loader code 8B13, which refers to an injected DLL 8B11, and injected security code and data 8B14. The executable file 8B10 is shown after being modified to include the DLL loader code 8B13 as discussed with reference to FIG. 6. Thus, the application entry point indicator 8B12 has already been modified to point to the injected DLL loader code 8B13. Thus, when the executable file is executed, the DLL loader code 8B13 will be executed first. However, in FIG. 6, the DLL loader code contained a transfer instruction to transfer control back to the original application executable code entry point. In the case shown in FIG. 8B, where security code will also be injected, this transfer instruction is not added at that point. Instead, after the security code and data 8B14 are injected into the executable file 8B10, a transfer instruction is added to transfer control back to the original application entry point plus encrypted data 8B15, which points to the first instruction in the executable code image that appears after the encryption code portion 8B16. According to this technique, then, the injected security code preferably directly follows the loader code so that it is immediately executed after the injected DLL is loaded by the operating system. However, one skilled in the art will recognize that other techniques are possible instead of depending upon order, including transferring control from the loader code to a predetermined location where the injected security code is stored. In FIG. 8B as in FIG. 8A, checksums are computed on various pieces of the executable file and stored at a predetermined location within the executable file 8B10.

Figure 9:
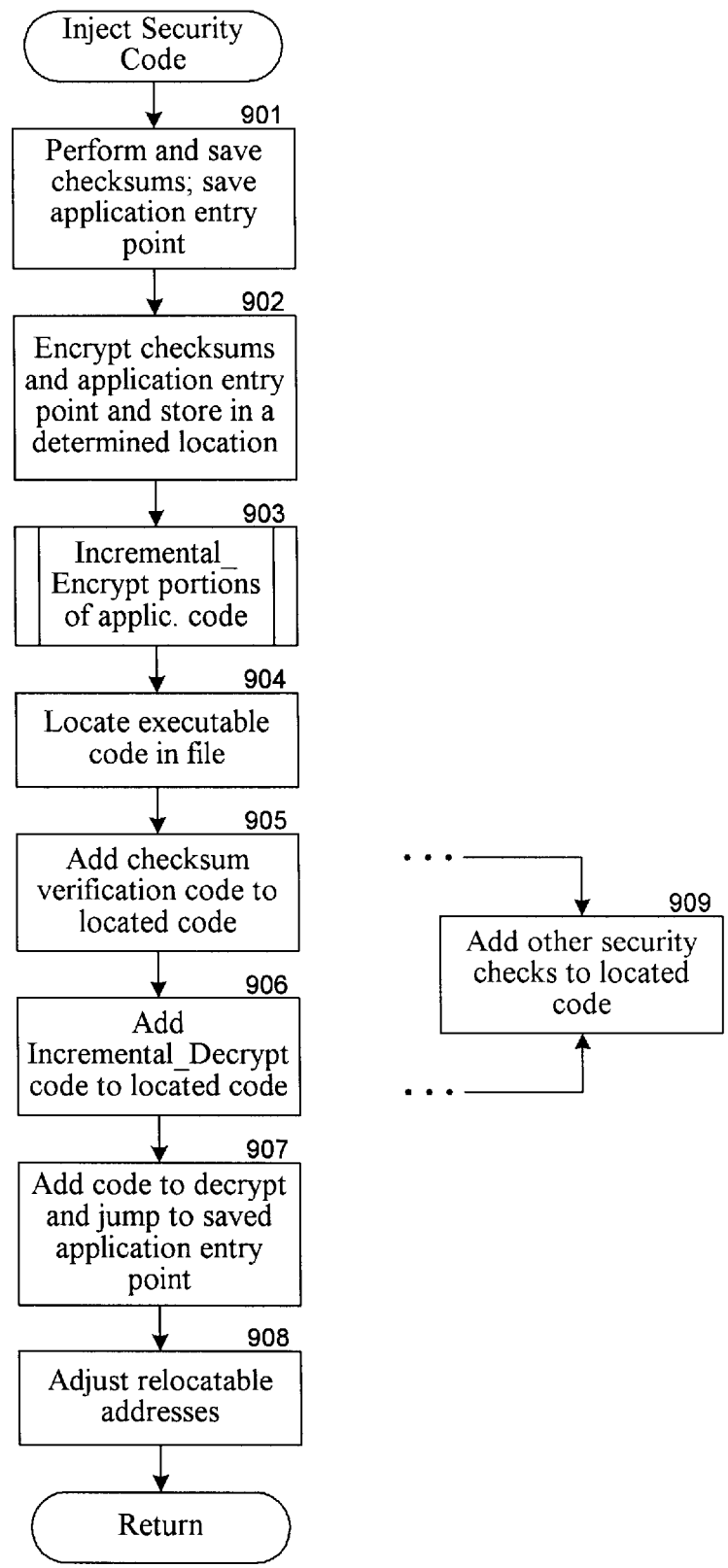
FIG. 9 is an overview flow diagram of the steps performed by the injection mechanism for injecting security code and data into an executable file.

FIG. 9 is an overview flow diagram of the steps performed by the injection mechanism for injecting security code and data into an executable file. The injection mechanism performs and stores checksums and inserts security code into an executable file. Specifically, in step 901, the injection mechanism performs checksums on various components and saves them in addition to saving the original application code entry point. Preferably, a checksum is computed on the import table and a checksum is computed on a small range of the injected DLL image. So, for example, in the case where a licensing DLL is the injected DLL, some portion of the licensing code is likely part of the range of the checksum. The small range ensures that the speed of the calculation of checksums is fast, but that the mechanism still accomplishes its security goals. The range of the injected DLL to be checksummed is preferably not publicized and is determined by (and can be changed by) the programmer using the injection mechanism. The checksum operation can be provided by any standard checksumming routine that reads a portion of the data, logically combines the data portion with a mask, and adds the combined data to a compounded checksum result. For example, Table 1 below provides a sample checksum algorithm:

TABLE 1 for each portion of data of a total amount to be checksummed
    x = read (portion of data);
    result = AND (x, mask);
    checksum = checksum + result;
endfor;

In step 902, the routine encrypts the computed checksums and the saved application code entry point and stores the encrypted information in a predetermined location, which also is preferably not disclosed. Note that either the various checksums and the application entry point can be encrypted all at once and decrypted all at once or they can be encrypted and subsequently decrypted using a separate key for each item. In addition, the data can be encrypted and decrypted according to an incremental encryption and decryption technique, which is discussed further below with reference to FIGS. 10, 11, 12, and 14.

In step 903, the inject security code routine calls an incremental encryption routine to encrypt portions of the executable code stored in the executable file. The amount of the executable code to be encrypted is preferably not publicized, is small, and can be modified by the programmer using the injection mechanism. A small portion ensures that the speed of the encryption and decryption is fast, but that the mechanism still accomplishes its security goals. In step 904, the routine determines where the executable code is located within the executable file. In step 905, the routine adds checksum verification code to a predetermined location within the located executable code. This checksum verification code is stored as part of the injected security code and data 8A05 and 8B14 shown in FIGS. 8A and 8B, respectively. In step 906, the routine adds incremental decryption code to a predetermined location within the located executable code. This incremental decryption code is also part of the injected security code shown as 8A05 and 8B14 in FIGS. 8A and 8B, respectively. In step 907, the injection mechanism adds code to retrieve the encrypted data (which was encrypted in step 902 and stored in the injected security code 8A05 and 8B14 shown in FIGS. 8A and 8B), and adds code to transfer control to the saved application entry point taking into account the size of the encrypted portion of the executable code. In step 908, the routine adjusts any relocatable addresses as necessary due to the addition of the code and data shown as injected security code and data 8A05 and 8B14 in FIGS. 8A and 8B, and returns.

Note that, in step 909, other security checks can be added to the located executable code at some points within this injection procedure. Preferably, security checks, such as making sure the program is running in a particular mode, are added to the inject security code routine in an unpublicized ordering of steps. Thus, the ellipses "..." in FIG. 9 represent that step 907 is added somewhere in this process. In a preferred embodiment, the injection mechanism performs a check to make sure the process is not in debug mode and, if so, aborts execution of the executable file. This prevents any undesired viewing of the executable code and security code, which can be used to create an unsecured, or unmodified version of the executable code.

Figure 10:
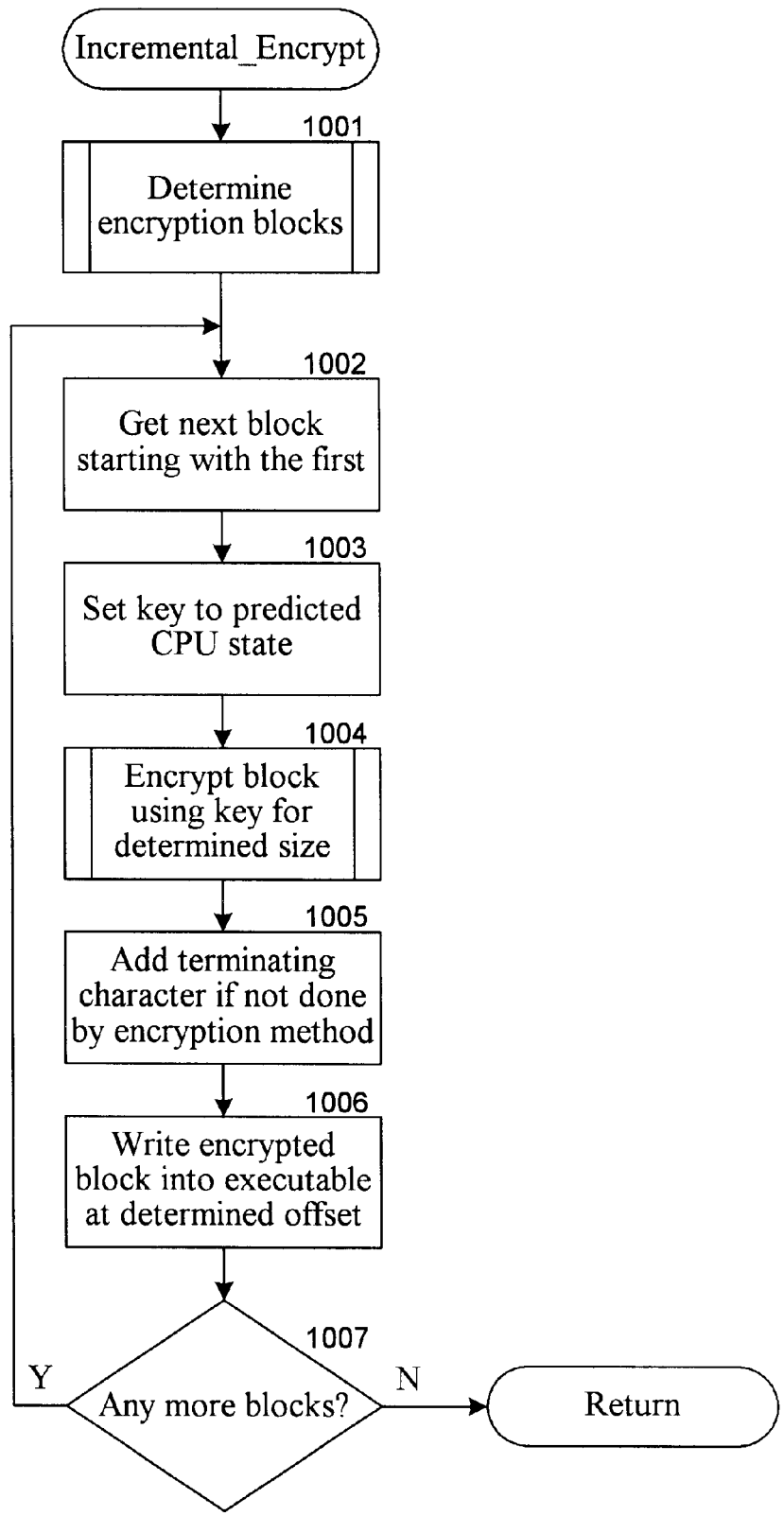
FIG. 10 is a flow diagram of the steps executed by an incremental encryption routine.

FIG. 10 is a flow diagram of the steps executed by an incremental encryption routine. The incremental encryption routine is invoked, for example in step 903, as part of the injection of the security code to encrypt portions of the executable code stored within the executable file. In step 1001, the routine calls a subroutine to determine the size (and location) of the blocks of data that will be encrypted. According to preferred techniques, the encrypted blocks are variable size and the determination routine will compute and store the size for each block. The determination routine is discussed in more detail with reference to FIGS. 11 and 12. In step 1002, the routine begins a loop to encrypt the determined number of blocks starting with the first block. In step 1003, the routine sets the encryption key to a predetermined set of flags (registers) which represent the CPU state as it will exist when the injected incremental decryption code (added in step 906 in FIG. 9) is executed by the system, i.e., when the executable file is executed.

In particular, the injection mechanism preferably does not publicize the particular flags used as a key. Any flags can serve this purpose as long as they meet the following criteria:

1. The flags do not vary from system to system, or from run of the executable file to run.
2. The flags can be fairly easily predicted.
3. Flags can be chosen based upon a "mode" in which the application will execute.

An example of a flag that does not meet the first criteria is a flag that counts the total number of executions since power-up, because the total number of executions since power-up can vary dramatically from system to system. An example of a flag that does not meet the second criteria is the CPU instruction counter, because where the executable code is physically located in memory when it is loaded will vary. An example of a flag based upon a mode is whether the process is executing in "user mode" or "protected mode" on an Intel processor. Preferably, the injection mechanism does not publicize the exact flags used and how they are combined so that it is more difficult to break into and unmodify the executable file with injected code. Any key that meets these criteria preferably will be operable within the injection mechanism.

In step 1004, the incremental encryption routine encrypts the current block of data using the determined key for the block size that was specifically determined for that block in step 1001. Note that any known encryption routine can preferably be used with the injection mechanism of the present invention. In one preferred embodiment a basic permutation encryption algorithm is utilized. Permutation encryption algorithms, as well as many other types of algorithms, are described in detail in Bruce Schneier, *Applied Cryptography*, 2d ed, John Wiley & Sons, 1996, which is hereby incorporated by reference. In essence, a permutation encryption routine reorders the bits within the data block being encrypted using a mathematical algorithm that can be duplicated in reverse. Also, for the purposes of the present invention, it is assumed that the encrypted data produced by the chosen algorithm is the exact same size as the original data. However, one skilled in the art, will recognize that any encryption technique can be utilized including those that change the size of the encrypted data from the original data. In that case, the differences in size must be tracked and accounted for by the injection mechanism, especially in the encryption and decryption routines and in the adjustment of relocatable addresses step performed by many of the routines. In step 1005, if the encryption algorithm does not add a terminating character to the block encrypted, then the injection mechanism preferably does so. In an alternative embodiment the encryption and decryption routines keep track of the size of each block and incorporate this size into the decryption procedure. In step 1006, the incremental encryption routine writes the encrypted block of data into the executable file at the same location where the unencrypted block was. In this way, the injection mechanism replaces the original executable code image with encrypted versions of the image. In step 1007, the routine checks to see if there are any more blocks that need to be encrypted and, if so, returns to the beginning of the loop at step 1002 to process the next block, else returns.

Figure 11:
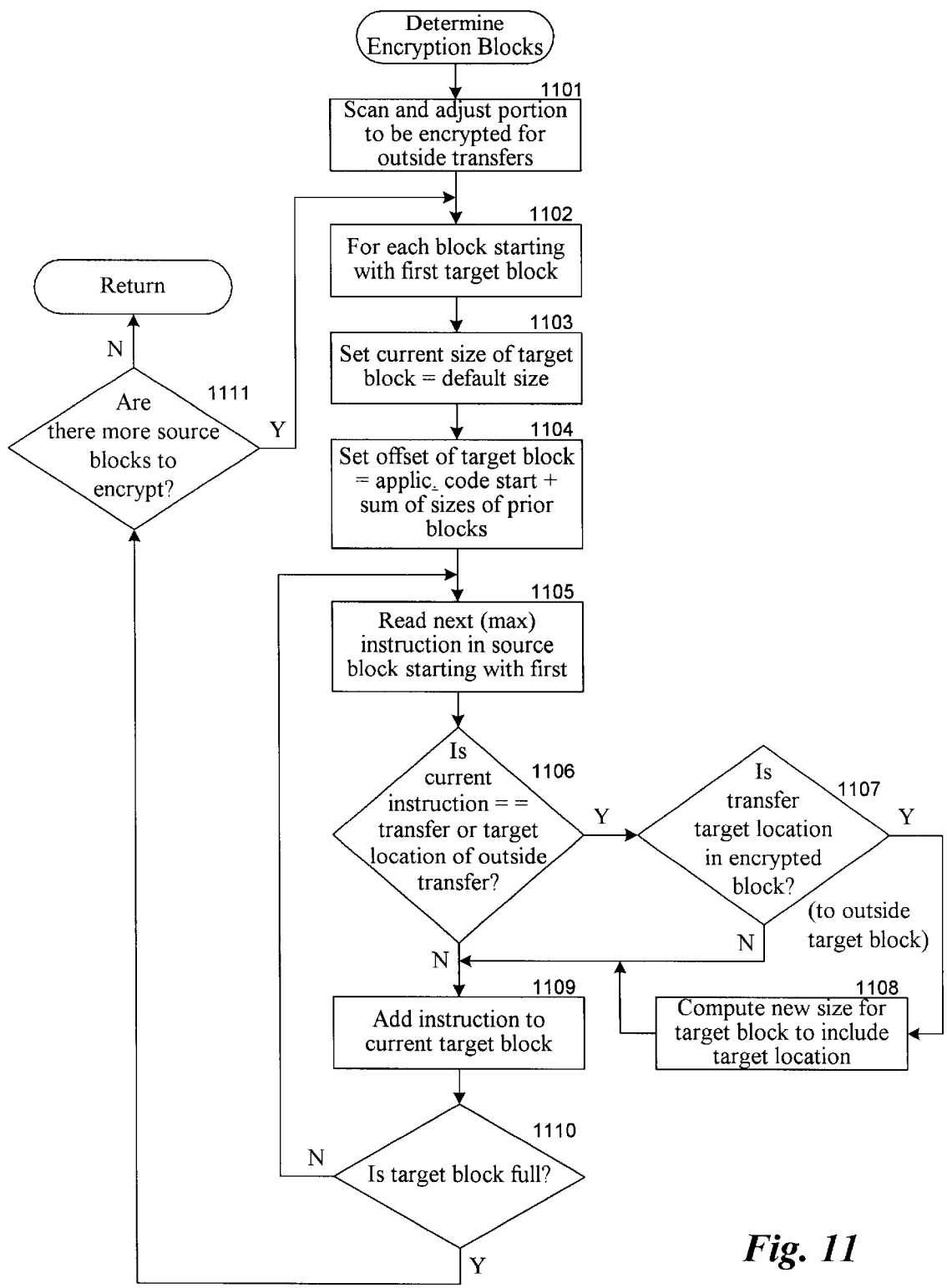
FIG. 11 is a detailed flow diagram of the steps performed by the injection mechanism to determine the number and size of the encryption blocks of data to be encrypted using the incremental encryption technique.

FIG. 11 is a detailed flow diagram of the steps performed by the injection mechanism to determine the number and size of the encryption blocks of data to be encrypted using the incremental encryption technique. The Determine Encryption Blocks routine takes as input a projected number of blocks and a default size desired for each block. (The default size may also be hardcoded or calculated.) The incremental encryption and decryption process operates on the principle that only a portion of the data to be encrypted should be encrypted or decrypted at any one time so that it is more difficult to break through the encryption. Because the data is preferably never fully decrypted at any one time, it is more difficult for a process to cache a copy of the decrypted code in order to produce an unmodified version of the executable file. Thus, the role of the Determine Encryption Blocks routine is to determine what part of the data to be encrypted will be placed in each encrypted block and to store this information so that the encryption and decryption routines can determine how much data to encrypt/decrypt at any one time.

Also, the Determine Encryption Blocks routine is responsible for setting up each encrypted block to ensure that each block can be decrypted and executed independently from every other block. Thus, the routine constrains the blocks such that there is preferably exactly one entry point into the block from outside the block (a "fall through") and exactly one exit point out of the block to another encrypted code block. Any algorithm capable of maintaining this constraint could be utilized. For example, in the Determine Encryption Blocks routine of FIG. 11, the routine first scans the non-encrypted execution code and adjusts the portion of the code to be encrypted to ensure that there are no transfers back into encrypted code from outside. Then, the routine divides the data to be encrypted into target blocks and tries to place the maximum amount of data into each target block, up to the default block size, with two exceptions. The exceptions occur when a transfer instruction is encountered. Specifically, when the current source data block contains transfer instructions to target locations within encrypted code that is located outside of the current block, the size of the target block is enlarged to encompass the transfer instruction. Similarly, when the current data block contains a location that is a target of a transfer instruction originating in encrypted code that is outside of the current block, the size of the target block is enlarged to encompass the transfer instruction. These adjustments ensure that, in the decryption process, all instructions that are needed to decrypt a particular portion of code are available.

Specifically, in step 1101, the routine scans the portion of the source data that is not to be encrypted looking for transfer instructions whose target locations occur within the data to be encrypted. When it encounters such a transfer instruction, the routine adjusts the size of the area of data to be encrypted to stop short of the target location of the transfer instruction. This adjustment ensures that there are no transfers into the encrypted data portion from the unencrypted data portion. The routine also scans the portion of data to be encrypted for transfer instructions with target locations having addresses that occur before the addresses of the corresponding transfer instructions (backward references to encrypted data). When such an instruction is encountered, the routine keeps track of both the target location and the location of the transfer instruction in order to make target block adjustments later (see steps 1106–1108). In step 1102, the routine begins a loop to fill target blocks, beginning with the first target block. In one embodiment, the data to be encrypted is copied into a correct size target block in temporary storage. However, one skilled in the art will recognize that other techniques are possible, including those that simply keep track of the original data and the division into different blocks. In step 1103, the Determine Encryption Block routine sets the size of the current target block equal to the default size. In step 1104, the routine determines and keeps track of where in the source data the new block begins, as an offset. Assuming the source data begins at the code entry point of the executable file, this offset is the calculation of the start address (the entry point) of the executable code in the executable file plus the sum of the computed sizes of the prior target blocks.

Steps 1105–1110 comprise an inner loop which copies machine instructions to the temporary target block by determining how many can be transferred and whether there are transfer instructions that will affect the size of the current source block. In particular, in step 1105, the routine reads the next machine instruction in the source block starting with the first instruction. Since instruction sizes can vary, the routine preferably makes sure that it reads the maximum size instruction possible. In step 1106, the routine determines whether the current instruction is a transfer instruction or the target location of a transfer instruction located outside the current source block and, if so, continues in step 1107, else continues in step 1109. In step 1107, if the current instruction is a transfer instruction, the routine further determines whether the transfer instruction is to a target location in an encrypted block that is outside of the current target block and, if so, continues in step 1108, else continues in step 1109. (Transfers to locations within the encrypted block do not cause size adjustments as they do not constitute additional entries to or exits from the current block.) In step 1108, the routine computes a new size for the current target block to extend to and include the target location of the transfer instruction if the current instruction is a transfer or to extend to and include the corresponding (saved) transfer instruction if the current instruction is the target location of a transfer initiated outside of the current target block, and continues in step 1109. As mentioned, the purpose of this step is to ensure, for use with the incremental decryption process, that there are no transfer instructions to an encrypted block outside of the current target block and that there are no transfer instructions from an outside block into the current target block. In step 1109, the routine copies the current instruction to the current target block in the temporary storage. In step 1110, the routine determines whether the target block has been filled and if so, continues in step 1111, else returns to the beginning of the inner loop at step 1105. In step 1111, the routine determines whether there are additional source blocks to encrypt and, if so, continues back to the beginning of the outer loop to determine more target blocks in step 1102, else returns.

Figure 12:
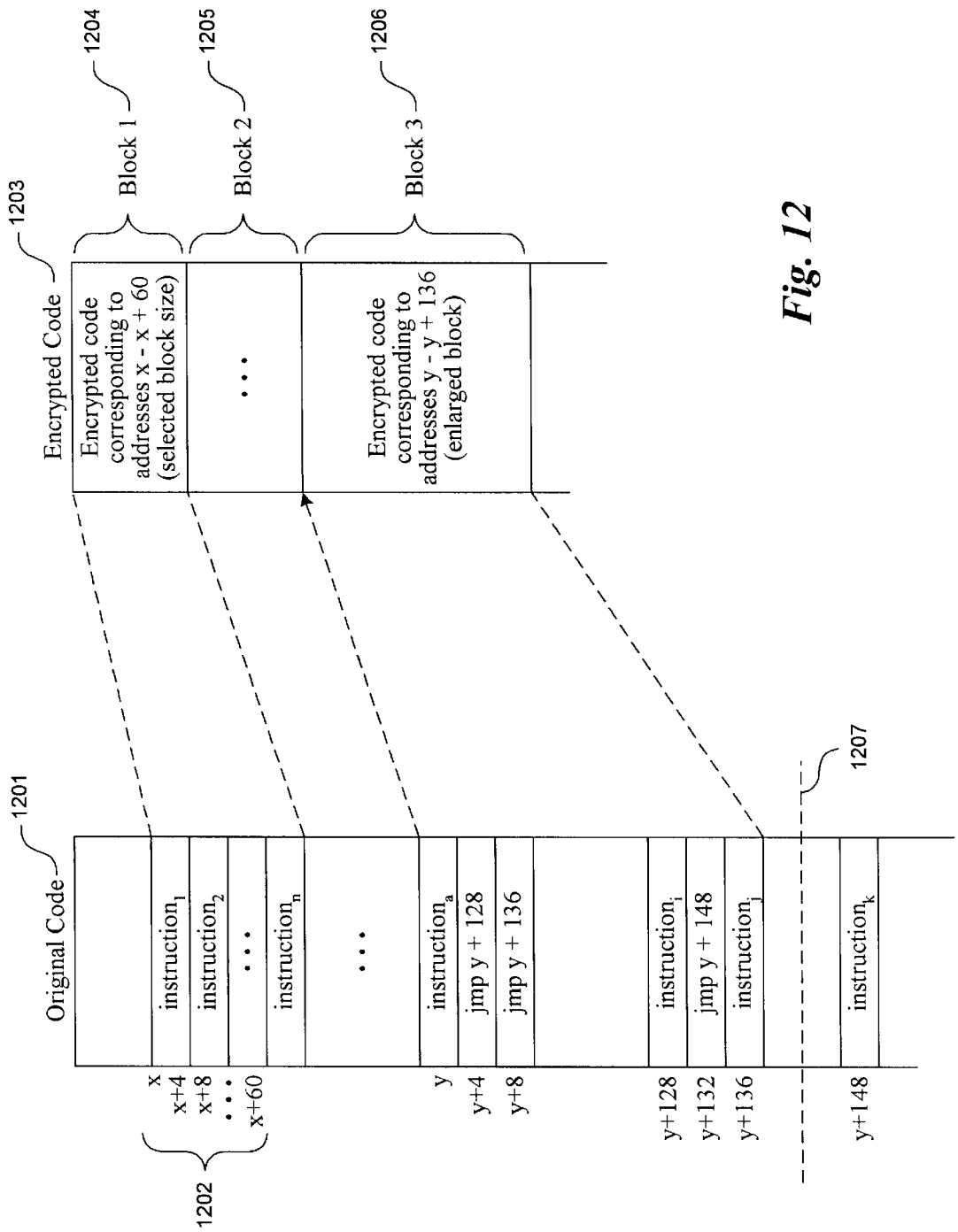
FIG. 12 is an example block diagram of the results of determining the size of encryption blocks according to the technique of FIG. 11.

FIG. 12 is an example block diagram of the results of determining the size of encryption blocks according to the technique of FIG. 11. The original code 1201 is shown on the left hand side and the transferred code 1203 is shown on the right hand side. The transferred code is referred to as "encrypted code," even though it is not encrypted at this point. Referring to FIG. 10, once the code is divided into blocks and the block sizes are determined, the incremental encryption routine actually encrypts the blocks in step 1004. Original code 1201 contains a series of instructions shown as beginning at logical address "x." Three target blocks of the encrypted code 1203 are shown as Block 1 (1204), Block 2 (1205), and Block 3 (1206). Using the steps shown in FIG. 11, the instructions located at logical addresses "x" through logical address "x+60" (instructions 1–n) are copied directly to Block 1, because they do not contain transfer instructions and because they exactly fill the default size of a block, which here is assumed to be 64. The next set of instructions from original code 1201 are continued to be copied into target Block 2 in the encrypted code 1203. The example shows instruction$_a$ at logical address "y" being transferred to the beginning of encrypted Block 3. When the routine reaches the instruction at logical address "y+4," in original code 1201, the routine determines that the instruction is a transfer instruction, shown here as "jmp y+128." Since the calculation of "y+128" is greater than the default size for the block (64), it can be seen that this transfer instruction has a target location that is outside of the current target block. It can be further noted that the original code 1201 at logical address "y+128" is a target location that is also encrypted, and therefore Block 3 needs to be extended in size to include the instruction at logical address y+128. Next, at logical address "y+8," the instruction is also a transfer instruction, this time to the instruction of target location logical address "y+136." Again, the original code 1201 at logical address "y+136" is within the code area to be encrypted, and therefore Block 3 must once again be extended in size to include the instruction of the target location "y+136." The routine continues with copying the instructions from original code 1201 into the target block 1203 until it reaches another transfer instruction or until the current size of now enlarged Block 3 is reached. For example, the instructions located through logical address "y+128" are copied over. At logical address "y+132," there is another transfer instruction listed as "jmp y+148." This time, the transfer instruction to logical address y+148 transfers to an area of the original code 1201 that is not intended to be encrypted, as shown by the dotted line 1207. Thus, in this case, Block 3 is not extended in size. Further, since the target block was previously enlarged to include the instruction at location y+136, this instruction is copied over to Block 3, which terminates the filling of Block 3.

Figure 13:
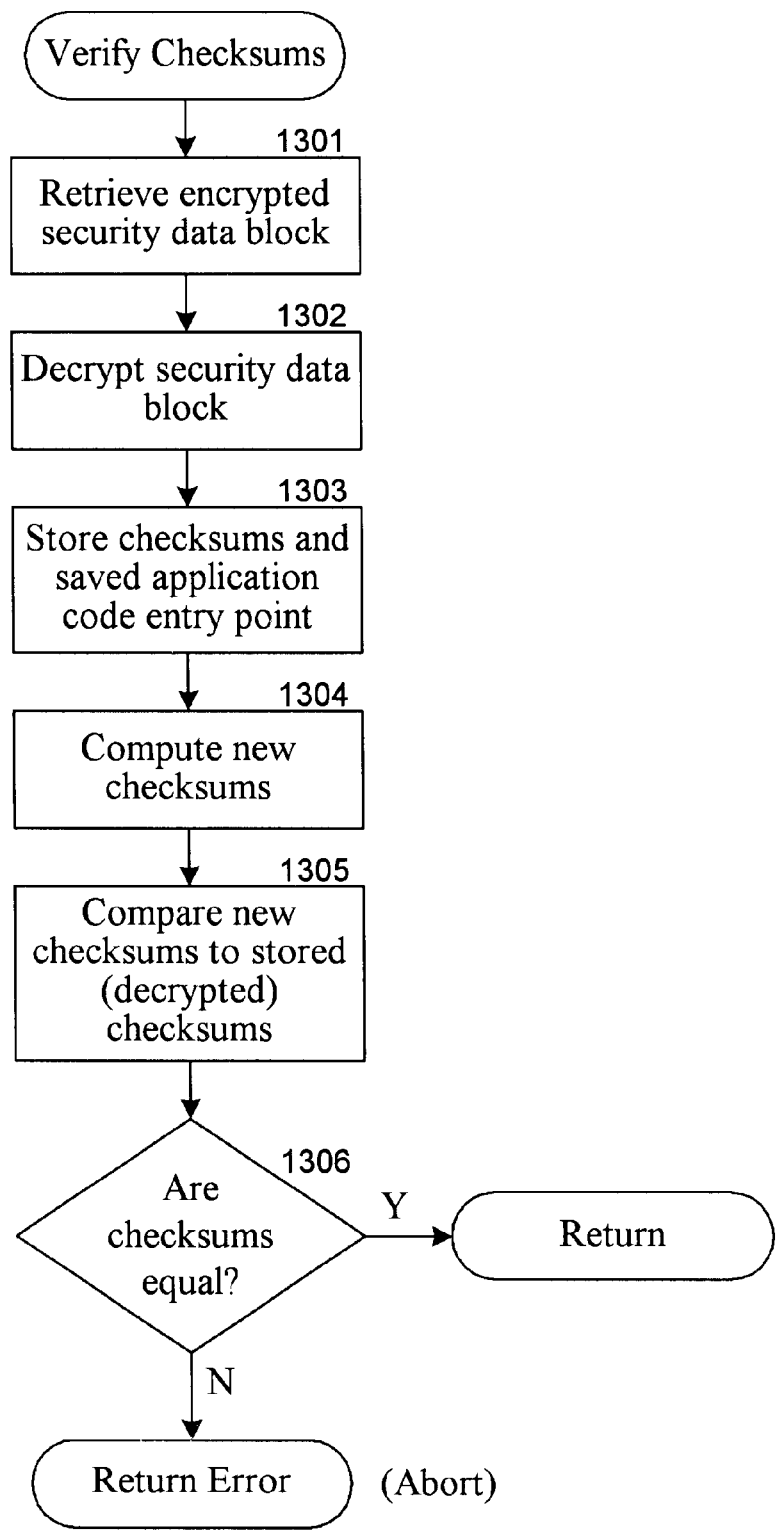
FIG. 13 is a detailed flow diagram of the verify checksum code added by the injection mechanism to an executable file.

FIG. 13 is a detailed flow diagram of the verify checksum code added by the injection mechanism to an executable file. Specifically, the inject security code portion of the injection mechanism adds the checksum verification code in step 905 in FIG. 9. The verify checksum code, when executed by the application, is responsible for retrieving the encrypted security data, setting up the data values appropriately, and verifying that the checksums are correct and that no tampering with the executable file has taken place. In particular, in step 1301, the verify checksum routine retrieves the encrypted security data block from the predetermined location. As mentioned with reference to FIG. 9, it is preferable that this location not be publicized, but one skilled in the art will recognize that, once chosen, the routine that generates the original checksum and the routine that verifies the checksum preferably use the same location. In step 1302, the verify checksum routine decrypts the retrieved security data block. This step assumes, as did FIG. 9, that all of the security data was encrypted as a single data block. As mentioned, one could have encrypted the security data in individual pieces and the verify checksum routine would need to be changed accordingly. In step 1303, the routine stores the decrypted checksums and the previously saved application code entry point. In step 1304, the routine computes the same checksums computed in step 901 of FIG. 9. These checksums preferably include at least the import table and some range of the injected DLL. In step 1305, the routine compares the newly generated checksums to the decrypted checksums. Then, in step 1306, the routine determines whether the checksums are the same, and if so returns (or continues with processing). Otherwise, if the checksums are not the same, the implication is that the executable file has been tampered with, and thus the verify checksum routine returns an error or aborts processing.

Figure 14:
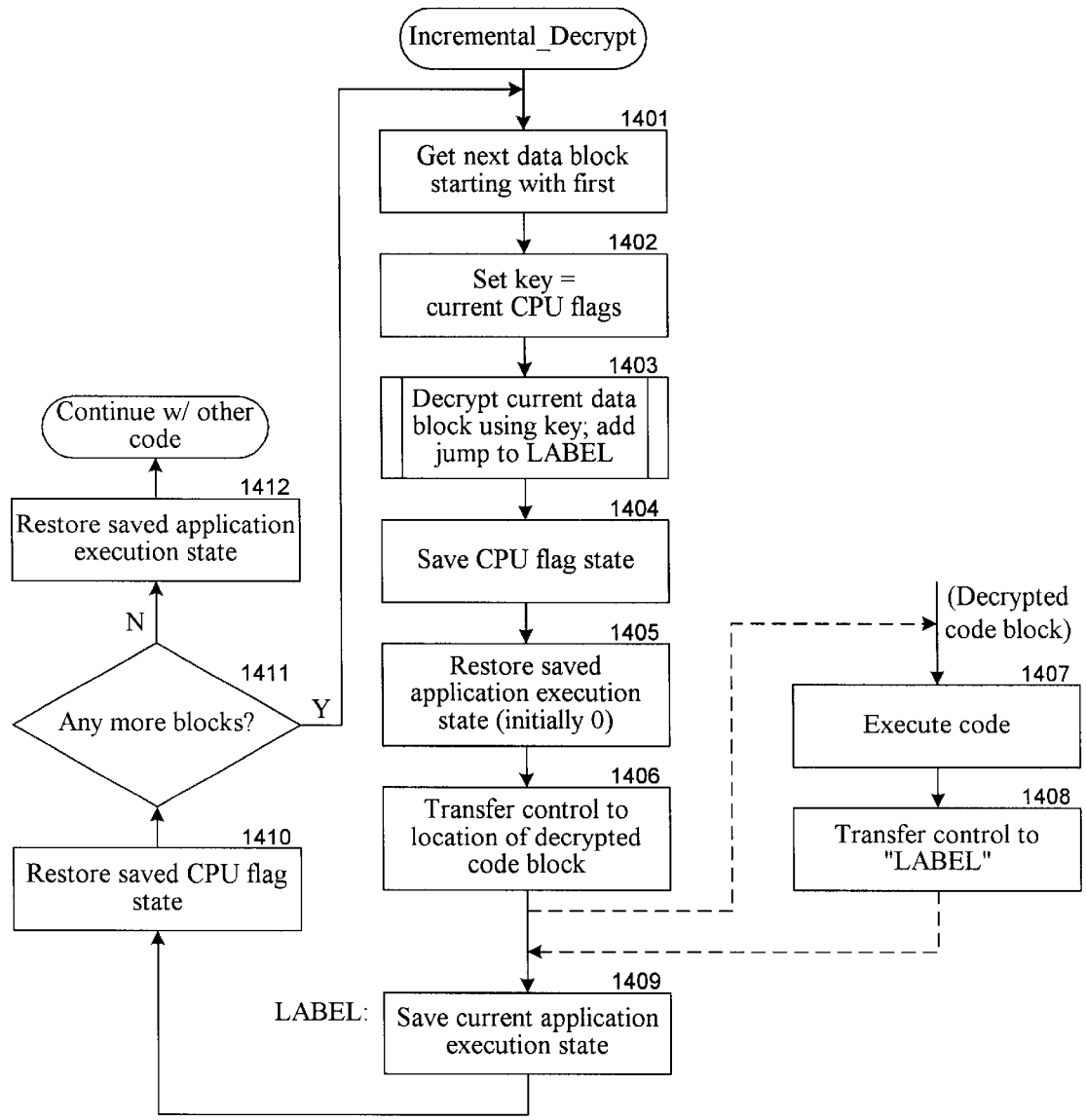
FIG. 14 is a detailed flow diagram of the steps performed by incremental decryption.

FIG. 14 is a detailed flow diagram of the steps performed by incremental decryption. The incremental decryption routine decrypts each block of data previously encrypted and executes each block, one at a time, so that the entire code is never decrypted and executed at once. This procedure helps prevent any kind of illegitimate caching of the executable code to generate an executable file that has not been modified with the injected DLL or security code. Recall that the executable code was encrypted into blocks of varying size, and that each block is guaranteed at this point to contain no transfer instructions to encrypted code outside of the block.

Specifically, in step 1401, the incremental decryption routines begins a loop over all of the encrypted blocks beginning with the first block. In step 1402, the routine generates a key using the current designated CPU flags. These flags are the same as discussed relative to the incremental encryption routine of FIG. 10, and because they do not vary, the key can be determined. In step 1403, the routine calls a decryption algorithm to decrypt the current block using the determined key. The routine also adds a transfer instruction to transfer to step 1409 (indicated by "LABEL:") so that once the decrypted block is executed, the decrypted code will return back to the incremental decryption routine. This procedure is discussed further below with reference to steps 1407–1408. The decryption routine preferably uses the mirror image of the algorithm used in the incremental encryption routine of FIG. 10, and any encryption/decryption algorithm that satisfies this criterion should work. In step 1404, the incremental decryption routine saves the state of the CPU flags in order to later on generate the key for the next block. In step 1405, the routine restores the saved executable code (application) execution state in order to execute the next block of the application code. This value is initialized to the initial executable state of the code, for example null. In step 1406, the routine transfers control to the location of the block that was decrypted in step 1403. The decrypted code block logic is shown in steps 1407–1408. In step 1407 the decrypted code executes, and in step 1408 the transfer instruction to "LABEL:" is executed. This transfers control to step 1409 in the incremental decryption routine. In step 1409, the routine saves the current application execution state so that it knows what state to restore in step 1405 for execution of the next block of the application code. In step 1410, the routine restores the CPU flag state that was saved in step 1404 to generate the next key for the next block. In step 1411, the incremental decryption routine determines whether there are any more blocks to decrypt and, if so, continues back to the beginning of the loop in step 1401, else continues in step 1412. In step 1412, the routine restores the saved application execution state (it is finished executing all of the encrypted application code) and then continues processing preferably in the application execution code that follows the injected incremental decryption code.

Although the present invention has been described in terms of preferred embodiments, it is not intended that the invention be limited to these embodiments. Equivalent methods, structures, processes, steps, and other modifications within the spirit of the invention fall within the scope of the invention. The scope of the present invention is defined by the claims which follow.

What is claimed is:

1. A method in a computer system for incrementally decrypting and executing an encrypted portion of an executable file to ensure that the entire decrypted portion is not in memory at the same time, the method comprising:

for each of a plurality of subportions of the encrypted portion,
storing a decrypted version of the subportion to overwrite any previously decrypted version of another subportion; and
executing the stored decrypted version of the subportion.

2. The method of claim 1 wherein the computer system has a context state and including:

before executing the stored decrypted version of the sub-portion,
saving the context state; and
setting the context state to a previously saved context state for the encrypted portion; and
after executing the stored decrypted version of the subportion,
saving the context state for the encrypted portion; and
setting the context state to the context state saved before executing the stored decrypted version.

3. A method in a computer system for encrypting executable code into subportions that can be decrypted one at a time, the method comprising:

determining a plurality of source blocks of variable sizes, the size of each source block ensuring that code to be contained in an encrypted version of the source block will execute when decrypted without transferring to a location outside the source block that is encrypted; and for each determined source block,
determining a key;
encrypting the source block using the determined key; and
copying the encrypted source block into the executable file.

4. The method of claim 3, further comprising:

for each encrypted source block copied into the executable file,
determining a key based upon a context state;
decrypting the source block using the determined key;
storing the decrypted source block to overwrite any previously decrypted source block; and
executing the stored decrypted source block.

5. A method in a computer system for modifying an executable file to ensure that a tampered with version of the executable file is not executed, the executable file containing a main entry point reference that refers to the main entry point of the executable file, the method comprising:

replacing a portion of the executable file with an encrypted version of that portion;
adding to the executable file a copy of the main entry point reference of the executable file;
adding security code to the executable file; and
setting the main entry point reference of the executable file to refer to the added security code, whereby when the modified executable file is executed, control is transferred to the added security code referred to by the main entry point reference, wherein the added security code:
determines whether tampering has occurred that affects the execution of the executable file;
when tampering has occurred, terminates execution of the executable file; and
when tampering has not occurred,
replaces the encrypted portion with a decrypted portion; and
transfers control to the main entry point of the executable file.

6. The method of claim 5 wherein the added security code replaces and transfers control to subportions of the encrypted portion.

7. The method of claim 5, further comprising adding a checksum of a portion of the executable file to the executable file and wherein the added security code determines whether tampering occurred by recalculating the checksum of the portion of the executable file and comparing the recalculated checksum to the added checksum.

\* \* \* \* \*